Figure 1:
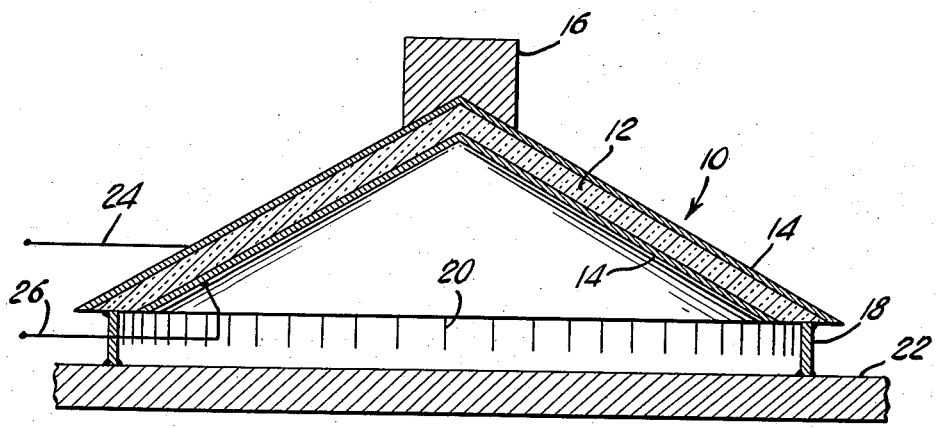

Sept. 24, 1963

W. T. HARRIS
HOLLOW CONICAL ELECTROMECHANICAL
TRANSDUCER IN SEALED HOUSING
Original Filed April 14, 1958

3,105,161

INVENTOR.
WILBUR T. HARRIS
BY
ATTORNEY 3,105,161
HOLLOW CONICAL ELECTROMECHANICAL
TRANSDUCER IN SEALED HOUSING
Wilbur T. Harris, Southbury, Conn.
Original application Apr. 14, 1958, Ser. No. 728,497, now Patent No. 3,030,606, dated Apr. 17, 1962. Divided and this application Jan. 3, 1962, Ser. No. 174,638
4 Claims. (Cl. 310—8.4)
(Granted under Title 35, U.S. Code (1952), sec. 266)

The invention described herein may be manufactured and used by or for the Government of the United States of America for governmental purposes without the payment of any royalties thereon or therefor.

This invention relates to improved electromechanical transducers that have utility in generating and intercepting compressional wave energy in mediums such as air and water. This application is a division of my application Serial Number 728,497, filed April 14, 1958, for Hollow Conical Electromechanical Transducer, which has matured in Patent No. 3,030,606 granted April 17, 1962, the latter is a continuation-in-part of my application Serial Number 343,531, filed March 19, 1953, for Transducer, now Patent Number 2,834,952.

Heretofore, many electromechanical transducer elements of magnetostrictive material and electric coils were made in the form of wound cylinders, rods, and laminated rings. Many other electromechanical transducer elements were in the form of cylinders or blocks comprising electrode coated materials of the type wherein mechanical strain is accompanied by corresponding voltage change between opposing electrodes and wherein change in voltage applied between the opposing electrodes is accompanied by corresponding mechanical strain in the coated materials. The mechanical and electrical considerations that have dominated previous transducer element designs have resulted in transducer elements that are not efficient, nor broadband, nor of light weight, nor small and compact.

An object of this invention is to provide an electromechanical transducer for use in a compressional wave transmitting medium such as air or water and that is more efficient, lighter in weight, smaller and more compact, and that is easier to fabricate and whose cost of material is less than for transducers available heretofore for corresponding service.

Another object is to provide a broadband electromechanical transducer in accordance with the aforementioned object.

Another object is to provide a broadband electromechanical transducer in accordance with the first-mentioned object.

Another object is to provide an audio frequency range electromechanical transducer in accordance with any one or more of the preceding objects and which is of exceptionally small size compared to transducers available heretofore for the same service.

A further object is to provide an acceleration and displacement sensitive transducer.

Figure 2:
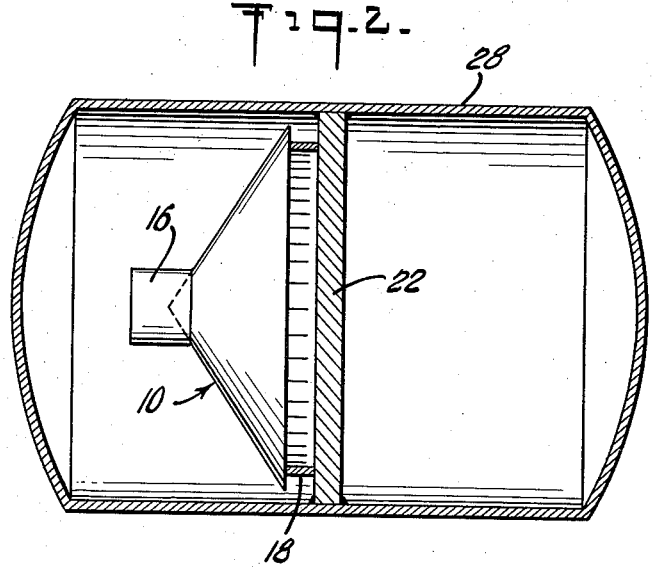

Other objects and many of the attendant advantages of this invention will be readily appreciated as the same becomes better understood by reference to the following detailed description when considered in connection with the accompanying drawings wherein:

FIG. 1 illustrates a subcombination in section and on an enlarged scale of the embodiment of this invention shown in FIG. 2; and FIG. 2 illustrates a transducer embodiment in accordance with this invention that is direction sensitive, that can convert compressional wave energy into corresponding electrical energy and electrical energy into corresponding compressional wave energy and that is acceleration and displacement responsive.

The disclosed embodiment of this invention includes at least one conical sensitive element 10 which is comprised of a hollow, substantially rigid, nonconductive cone 12 having inner and outer conical surfaces each of which are coated with a thin conductive film 14. The conductive films on the inner and outer surfaces are spaced apart at the base of the cone. The wall thickness of each cone 12 is substantially uniform. The material of which the cone 12 is made is of the type wherein mechanical strain in the altitude and circumferential dimensions of the cone 12 is accompanied by corresponding voltage change between the conductive films 14. Conversely, change in voltage applied between the conductive films 14 on the inner and outer faces of cone 12 is accompanied by mechanical strain in the altitude and circumferential dimensions of the cone tending to set up compressional waves in the surrounding medium. An electrostrictive material such as barium titanate, properly polarized, is suitable for this invention. Barium titanate as an electrostrictive material is described in substantial detail in U.S. Patent #2,486,560.

A weight 16 of a very rigid material that is substantially more dense than the cone material is secured to the apex portion of the cone coaxial with the cone and proximate with the apex of the cone. The weight 16 may be bonded to the outside of the cone as in the drawings, or it may be bonded to the inside of the cone, or it may include a stem which pierces the apex and is bonded therein. Relatively, soft materials such as lead are not desirable for weight 16 because they deform too readily under the conditions of use.

The conical sensitive element 10 described above has a broad band character. This is best appreciated by imagining the cone as made up of a graded series of stacked rings transverse to the axis of the cone, one above the other. Each of the rings is resonant at a different frequency. The largest diameter ring has the lowest resonant frequency and the smallest diameter ring has the highest resonant frequency. At all frequencies between the above limits there is a ring portion of the cone that is resonant. The weight 16, secured to the apex of the cone, lowers and narrows the resonant frequency band of the cone 10. The efficiency of the weighted cone in its relatively narrow band is substantially higher than the efficiency of the unweighted cone in the same band. The efficiency of both the weighted cone and the unweighted cone is exceptionally high not only for the preceding reasons but also because mechanical impedance of the cone can be matched to the compressional wave medium wherein it is to be used by proper selection of wall thickness, cone angle and overall size. In a broadband cone-shaped transducer, sensitivity and mechanical impedance exhibit the following relationship with the cone parameters:

|  | Sensitivity | Mechanical Impedance |
| --- | --- | --- |
| Increased Wall Thickness | Decreased | Increased. |
| Steeper Cone | do | Do. |
| Increased Overall Cone Size | Increased | Decreased. |

In the narrow band cone-shaped transducer, sensitivity, frequency, mechanical Q, and mechanical impedance exhibit the following relationships with cone parameters:

|  | Sensitivity | Frequency | Mechanical Q | Mechanical Impedance |
| --- | --- | --- | --- | --- |
| Increased Wall Thickness | Increased | Increased | Increased | Increased. |
| Steeper Cone | Decreased | do | do | Do. |
| Increased Overall Cone Size | Increased | Decreased | Decreased | Decreased. |

The cones in this invention possess useful sensitivity at frequencies which are lower than their lowest resonant frequencies, though the sensitivity is substantially lower than within the resonant frequency limits.

Cone 10 is bonded to a ring 18 of a rigid resilient material having a series of substantially equally spaced slits 20 that are parallel to the axis of the ring and extend from that open end of the ring which is bonded to the base of the cone toward, but not to, the other open end of the ring. The other open end of ring 18 is bonded to a rigid plate 22. Leads 24 and 26 are electrically connected to the outside and inside conductive films respectively. The leads 24 and 26 are short and lightweight so as not to mechanically load the transducer, terminating at a support, not shown, adjacent to the transducer and electrically connected to an electric cable at that support, as is conventional. The ring 18 prevents the cone from tilting relative thereto, opposes axial movement of the base of the cone relative thereto, and readily permits circumferential strain or radial movement of the base of the cone. The ring 18 opposes axial movement of the base of the cone relative thereto to a far greater degree than circumferential strain at the base of the cone. The air within the space defined by the cone 12, the ring 18, and the plate 22 is sufficiently isolated from the outside air that there is only a small percentage transfer of compressional wave energy from the air outside the transducer to the air inside the transducer and from the air inside the transducer to the air outside the transducer. This transducer is exceptionally efficient because its mechanical impedance is matched to the air and because of its superior resonance characteristic both with and without weight 16. The mounting ring 18 while serving as an excellent support for the cone offers little impedance to radial motion of the base of the cone and hence exercises minor damping or loading effect on the cone.

In the embodiment shown in FIG. 2, the device of FIG. 1 is secured to the inside of a sealed cylindrical housing 28 with spherical ends. The cone 10, weight 16, and ring 18 are spaced from the walls of the housing. This transducer is directional being relatively insensitive to force, acceleration, or displacement transverse to the axis of the cone 10 and sensitive to force, acceleration, and displacement that is generally parallel to the axis of the cone. This is due to the inertia of the weight 16 and also is due to the fact that force applied to plate 22 transverse to the axis of the cone 10 produces no significant strain in the altitude and circumferential dimensions of the cone 10. If compressional wave energy traverses the housing 28, it causes the housing to move accordingly. If the direction of the energy is generally parallel to the axis of the cone 10, the housing 28 and the ring 18 tend to move axially relative to the weight 16. Consequently, this embodiment has exceptional utility as a low frequency directional hydrophone receiver and may also be small compared to a wavelength of received energy. By comparison, conventional hydrophones of the volume changing type need to be large to be directional at low frequencies. This embodiment also has utility as an accelerometer and as a displacement sensitive device since forces acting on the unit as described above, if in the general direction of the axis of cone 10, produce strain in the cone.

This invention is exceptionally efficient and is relatively small and compact compared to transducers available heretofore.

Obviously many modifications and variations of the present invention are possible in the light of the above teachings. It is therefore to be understood that within the scope of the appended claims the invention may be practiced otherwise than as specifically described.

I claim:

1. An improved electromechanical transducer comprising: a hollow substantially rigid nonconductive cone having inner and outer conical surfaces which are each coated with thin conductive films spaced apart at the base of said cone, said cone being of a material of the type wherein strain in the altitude and circumferential dimensions of the cone is accompanied by corresponding voltage change between said conductive films and wherein change in voltage applied between said conductive films is accompanied by strain in the altitude and circumferential dimensions of said cone tending to set up compressional waves in the surrounding medium, a compact weight member whose density is greater than that of the cone material secured to and proximal with the apex of said cone, means secured to the base of said cone for opposing lateral tilting of said cone and for opposing axial movement of the base of said cone relative thereto to a greater degree than circumferential strain at the base of said cone when compressional wave energy is intercepted by said cone or when electrical energy is applied to said cone by way of said conductive coatings, and a rounded rigid housing defining a sealed chamber therein, said cone and said means disposed in the sealed chamber, said means being rigidly secured to said housing at a portion thereof remote from the securement thereof to said cone and said cone being spaced from the inside walls of said housing, whereby said transducer is acceleration and displacement sensitive in the direction of the axis of said cone, and is sensitive to compressional wave energy intercepted by said housing and in a direction generally parallel to the axis of said cone even when said transducer is small compared to the wavelength of intercepted compressional wave energy.

2. An improved electromechanical transducer comprising: a hollow substantially rigid nonconductive cone having inner and outer conical surfaces which are each coated with thin conductive films spaced apart at the base of said cone, said cone being of a material of the type wherein strain in the altitude and circumferential dimensions of the cone is accompanied by corresponding voltage change between said conductive films, a compact weight member whose density is greater than that of the cone material secured to and proximal with the apex of said cone, and means secured to the base of said cone for opposing lateral tilting of said cone relative thereto and for opposing axial displacement of the base of said cone relative thereto to a greater degree than radial displacement of the base of said cone relative thereto, and a rounded rigid housing defining a sealed chamber therein, said cone and said means disposed in the sealed chamber, said means being rigidly secured to said housing remote from its securement to said cone, said cone being spaced from the inside walls of said housing, whereby said transducer is acceleration and displacement sensitive in the direction of the axis of said cone, and is sensitive to compressional wave energy intercepted by said housing and in a direction generally parallel to the axis of said cone even when said transducer is small compared to the wavelength of the intercepted compressional wave energy.

3. An improved electromechanical transducer comprising: a hollow substantially rigid nonconductive cone having inner and outer conical surfaces which are each coated with thin conductive films spaced apart at the base of said cone, the inwardly directed surface of the conductive film on the inner conical surface and the outwardly directed surface of the film on the outer conical surface being free of any covering and exposed, said cone being of a material of the type wherein strain in the altitude and circumferential dimensions of the cone is accompanied by corresponding voltage change between said conductive films and wherein change in voltage applied between said conductive films is accompanied by strain in the altitude and circumferential dimensions of said cone, a compact weight member whose density is greater than that of the cone material secured to and proximal with the apex of said cone, means secured to the base of said cone for opposing lateral tilting of said cone relative thereto and for opposing axial movement of the base of said cone relative thereto to a substantially greater degree than circumferential and radial strain at the base of said cone, and a rounded rigid housing defining a sealed chamber therein, said cone and said means disposed in the sealed chamber, said means being rigidly secured to said housing at a portion thereof remote from the securement thereof to said cone and said cone being spaced from the inside walls of said housing whereby said transducer is acceleration and displacement sensitive in the direction of the axis of said cone, and is sensitive to compressional wave energy intercepted by said housing in a direction generally parallel to the axis of said cone even when said transducer is small compared to the wavelength of intercepted compressional wave energy.

4. An improved electromechanical transducer comprising: a hollow substantially rigid nonconductive cone having inner and outer conical surfaces which are each coated with thin conductive films spaced apart at the base of said cone, said cone being of a material of the type wherein strain in the altitude and circumferential dimensions of the cone is accompanied by corresponding voltage change between said conductive films, a compact weight member whose density is greater than that of the cone material secured to and proximal with the apex of said cone, and means secured to the base of said cone for opposing lateral tilting of said cone relative thereto and for opposing axial displacement of the base of said cone relative thereto to a greater degree than radial displacement of the base of said cone relative thereto, and a rounded rigid housing defining a sealed chamber therein, said cone and said means disposed in the sealed chamber, said means being rigidly secured to said housing remote from its securement to said cone, said cone being spaced from the inside walls of said housing, whereby said transducer is acceleration and displacement sensitive in the direction of the axis of said cone, and is sensitive to compressional wave energy intercepted by said housing and in a direction generally parallel to the axis of said cone even when said transducer is small compared to the wavelength of the intercepted compressional wave energy.

References Cited in the file of this patent

FOREIGN PATENTS 118,239     Sweden _____ Feb. 25, 1947